No. 683,462. Patented Oct. 1, 1901.
C. C. HARRELL.
NUT LOCK.
(Application filed Feb. 26, 1901.)
(No Model.)
Fig. 1.
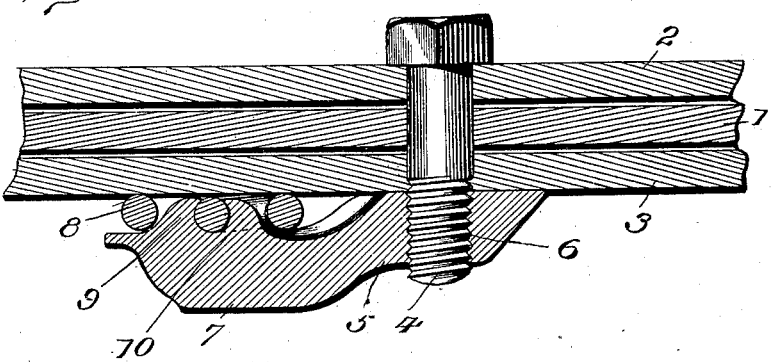
Fig. 2.
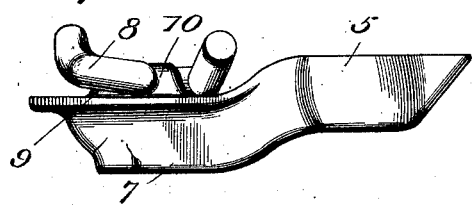
Fig. 3.
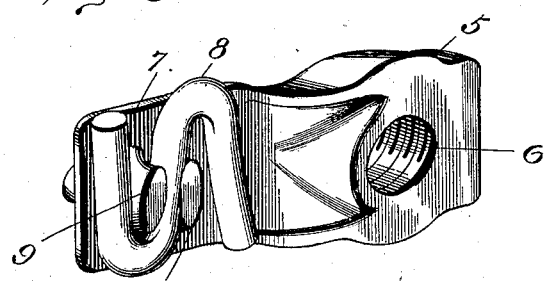
Fig. 4.
Witnesses
Jno. Morris.
Stewart Rice.
Inventor
Charles Coppage Harrell
By
Thos. E. Robertson, Attorney
THE NORRIS PETERS CO., PHOTO-LITHO., WASHINGTON, D. C.

UNITED STATES PATENT OFFICE.

CHARLES COPPAGE HARRELL, OF BAINBRIDGE, GEORGIA.

NUT-LOCK.

SPECIFICATION forming part of Letters Patent No. 683,462, dated October 1, 1901.

Application filed February 26, 1901. Serial No. 48,956. (No model.)

*To all whom it may concern:*

Be it known that I, CHARLES COPPAGE HARRELL, a citizen of the United States, residing at Bainbridge, in the county of Decatur, State of Georgia, have invented a certain new and useful Improvement in Nut-Locks, of which the following is a specification, reference being had to the accompanying drawings.

This invention relates to an improvement on that class of nut and bolt locks in which the nut is so formed that its threads "bite" the threads of the bolt; and the object of this invention is to produce a lock of this character which consists of the peculiar construction, arrangement, and combinations of parts hereinafter more particularly described, and then definitely claimed at the end hereof.

In the drawings which accompany and form part of this application, Figure 1 is a horizontal section of part of a rail and the fish-plates or angle-bars secured together by a bolt and the preferable though not necessary embodiment of my improved nut. Fig. 2 is a top plan view. Fig. 3 is a perspective, and Fig. 4 is an end, view.

Referring now to the details of the drawings by numerals, 1 represents part of the ordinary rail, and 2 and 3 the fish-plates or angle-bars usually employed on each side thereof, and through all of these is passed the securing-bolt 4, which may be made of any approved type. On the end of this bolt is my combined nut and nut-lock comprising the body portion formed with the screw-threaded bolt-hole 6 therein, by means of which the nut is secured on the bolt. This body portion 5 is provided with an offset part 7, which leaves a space in which is situated the spring 8, which is designed to cause the threads of the nut to bite the threads of the bolt. This nut is preferably a malleable casting and is formed with two integral lugs 9 and 10, between which is secured the S-shaped spring 8 by riveting the lugs over the central member of the spring, as shown in Fig. 4. It will be noticed that this S-shaped spring is peculiarly shaped in that its ends normally project out of a vertical plane, so as to make great pressure between the offset end of the nut and fish-plate or angle-bar. Hence when the bolt is screwed into this nut it causes the ends of the springs to move into, or more nearly into, a vertical plane, and in doing this the nut is slightly canted, so that the threads therein bite against the threads of the bolt, and thus prevent it from shaking or vibrating loose.

It is believed the operation of my improved nut-lock is obvious to those skilled in the art, and hence no description of the operation is necessary.

It is manifest that many changes may be made in my invention and that any preferred form of spring may be used or any desirable way of fastening the spring may be substituted for that shown. Hence any slight change may be made in my nut-lock without departing from the fundamental idea of my invention, which is a nut provided with an extension, under which extension is placed a spring which, forcing the extension away from the fish-plate, causes the nut to act as a lever and bite, and thus hold the parts from shaking loose; and although I have shown my device as applied to a railway-joint its use is not limited to such service.

What I claim as new is—

1. As a new article of manufacture, a nut comprising an extension, and a spring coacting with said extension, substantially as described.

2. As a new article of manufacture, a nut comprising an extension, a spring secured to the acting side thereof and arranged to force said extension outward, substantially as described.

3. As a new article of manufacture, a nut comprising an extension, a spring secured to the acting side thereof and having a member projecting out of the plane of the nut, substantially as described.

4. As a new article of manufacture, a nut comprising an extension, a spring secured to the acting side thereof, said spring having its ends projecting out of the plane of the nut, substantially as described.

5. As a new article of manufacture, a nut comprising an extension, lugs projecting therefrom and a spring held by said lugs, substantially as described.

6. As a new article of manufacture, a nut having an extension, lugs formed thereon, and an S-shaped spring secured by said lugs and having its ends projecting out of the plane of the nut, substantially as described.

In testimony whereof I affix my signature, in the presence of two witnesses, this 24th day of January, 1901.

CHARLES COPPAGE HARRELL.

Witnesses:
E. J. PERCY,
L. C. TOOLE.